US008811240B2

(12) United States Patent
Chindapol et al.

(10) Patent No.: US 8,811,240 B2
(45) Date of Patent: Aug. 19, 2014

(54) TECHNIQUES FOR RESOURCE ALLOCATION FOR STATIONS IN A FDD WIRELESS NETWORK

(75) Inventors: Aik Chindapol, Washington, DC (US); Roberto Albanese, Helsinki (FI); Andrea Bacioccola, Helsinki (FI); Zexian Li, Espoo (FI)

(73) Assignee: Nokia Corporation, Espoo (FI)

( * ) Notice: Subject to any disclaimer, the term of this patent is extended or adjusted under 35 U.S.C. 154(b) by 1296 days.

(21) Appl. No.: 12/111,958

(22) Filed: Apr. 29, 2008

(65) Prior Publication Data

US 2009/0268645 A1 Oct. 29, 2009

(51) Int. Cl.
*H04L 5/14* (2006.01)
*H04L 5/00* (2006.01)
*H04W 84/12* (2009.01)
*H04W 28/06* (2009.01)
*H04W 72/04* (2009.01)
*H04W 84/04* (2009.01)
*H04W 72/12* (2009.01)

(52) U.S. Cl.
CPC ............... *H04L 5/0007* (2013.01); *H04L 5/14* (2013.01); *H04W 84/12* (2013.01); *H04L 5/0094* (2013.01); *H04W 28/06* (2013.01); *H04W 72/042* (2013.01); *H04W 84/042* (2013.01); *H04W 72/12* (2013.01); *H04L 5/0091* (2013.01)
USPC ............................ 370/281; 370/329; 370/421

(58) Field of Classification Search
USPC ............................ 370/281, 329, 277, 436, 437
See application file for complete search history.

(56) References Cited

U.S. PATENT DOCUMENTS

| 6,272,117 | B1 | 8/2001 | Choi et al. |
| 6,990,090 | B2 | 1/2006 | Meier |
| 7,113,495 | B2 | 9/2006 | Furukawa |
| 2002/0102948 | A1 | 8/2002 | Stanwood et al. |
| 2005/0064818 | A1 | 3/2005 | Assarsson et al. |
| 2006/0029011 | A1 | 2/2006 | Etemad et al. |
| 2007/0076663 | A1 | 4/2007 | Qi et al. |
| 2007/0121546 | A1* | 5/2007 | Zuckerman et al. .......... 370/329 |

(Continued)

FOREIGN PATENT DOCUMENTS

WO    2009/047709 A2    4/2009

OTHER PUBLICATIONS

Non-Final Office Action Response for U.S. Appl. No. 12/049,265, filed Jan. 18, 2011, 13 pages.

(Continued)

*Primary Examiner* — Donald Mills
*Assistant Examiner* — Henry Baron
(74) *Attorney, Agent, or Firm* — Squire Patton Boggs (US) LLP

(57) ABSTRACT

Various example embodiments are disclosed herein. According to an example embodiment, an apparatus may include a controller, and a wireless transmitter coupled to the controller, the wireless transmitter configured to the wireless transmitter configured to transmit a Map message as part of a first group downlink (DL) region, the Map message allocating, to a full-duplex (FD) mobile station (MS), a first resource in a first group UL region and a second resource in a second group UL region. The transmitter may also be configured to transmit a dummy information element (IE), for example, as part of a second group DL region, the dummy information element (IE) reflecting at least the allocating to the FD MS of the second resource in the second group UL region.

33 Claims, 10 Drawing Sheets

(56) References Cited

U.S. PATENT DOCUMENTS

| | | | |
|---|---|---|---|
| 2008/0043650 A1* | 2/2008 | Jang et al. | 370/310 |
| 2008/0069067 A1 | 3/2008 | Sood et al. | |
| 2008/0089309 A1 | 4/2008 | Groleau et al. | |
| 2008/0268844 A1 | 10/2008 | Ma et al. | |
| 2009/0092066 A1 | 4/2009 | Chindapol et al. | |
| 2009/0092067 A1* | 4/2009 | Sudarshan et al. | 370/281 |
| 2009/0213766 A1 | 8/2009 | Chindapol et al. | |
| 2009/0219841 A1* | 9/2009 | Sudarshan et al. | 370/281 |
| 2009/0325578 A1 | 12/2009 | Li et al. | |

OTHER PUBLICATIONS

Final Office Action for U.S. Appl. No. 12/035,262, mailed on Dec. 10, 2010, 24 pages.
Non-Final Office Action for U.S. Appl. No. 12/049,265, mailed Jul. 22, 2010, 25 pages.
Jang, Heejin, et al., "Mobile IPv6 Fast Handovers Over IEEE 802.16e Networks", MIPSHOP Working Group, Internet Draft, Nov. 16, 2007, pp. 1-18.
Schultz, D., et al., "Proposal of the best suited deployment concepts for the identified scenarios and related RAN protocols", IST-2003-507581, WINNER, D3.5, version 1.0, May 1, 2006, 150 pages.
U.S. Appl. No. 12/049,265 Notice of Allowance mailed Oct. 13, 2011, 20 pages.
U.S. Appl. No. 12/163,084 Non Final Office Action mailed Oct. 27, 2011, 11 pages.
U.S. Appl. No. 12/035,262 Notice of Allowance mailed Jan. 9, 2012, 11 pages.
Final Office Action for U.S. Appl. No. 12/049,265, mailed on Mar. 18, 2011, 19 pages.
Restriction Requirement for U.S. Appl. No. 12/163,084, mailed on Jun. 9, 2011, 21 pages.
McBeath, Sean et al, "DCD/UCD Consideration for FDD", WiMAX Forum, pp. 1-5.
Xu, Allan et al., "R1.x FDD/Full Duplex Additional Option for 2 MAP Approach", WiMAX Forum (Apr. 28, 2008), pp. 1-4.
McBeath, Sean et al., "Serving F-FDD Mobile Stations v2", WiMAX Forum, pp. 1-5.
Chion, Mary et al., "Fix for Problems in UL Allocation", IEEE 802.16 Broadband Wireless Access Working Group (Jun. 12, 2005), http://ieee802.org/16, pp. 1-4.
Yagahoobi, Hassan "R1.5 FDD/HFDD Ad Hoc Apr. 2008 Opening Report", WiMAX Forum (Apr. 28, 2008), pp. 1-5.
Bacioccola, Andrea et al., "R1.x FDD/Full Duplex-Current Status", WiMAX Forum (Apr. 15, 2008), pp. 1-13.
Bacioccola, Andrea et al., "R1.x FDD/Full Duplex-Current Status and Open Issues", WiMAX Forum (Apr. 15, 2008), pp. 1-8.
Bacioccola, Andrea et al., "R1.x FDD/Full Duplex—Current Status and Open Issues", Wimax Forum (Mar. 12, 2008), pp. 1-15.
"R1.x FDD/HFDD Ad Hoc Mar. 2008 Recommendation to TWG", WiMAX Forum (Mar. 14, 2008), pp. 1-5.
Seol, Ji-Yun "Re11.x FDD/HFDD Flexible UL allocation signaling for F-FDD MS in H-FDD frame structure", WiMAX Forum (Apr. 2008), pp. 1-9.
Gal, Dan "Support of Full Duplex MS (OFDMA FDD) in draft IEEE 802.16Rev2/D4", WiMAX Forum (Apr. 7, 2008), pp. 1-6.
Bacioccola, Andrea, "R1.x FDD/Full Duplex—Current status", WiMAX Forum (Mar. 15, 2008), pp. 1-15.
Otyakmaz, Arif, et al., "Parallel operation of half-and full-duplex FDD in future multi-hop mobile radio networks", Jun. 22, 2008, pp. 1-7.
Schultz, D., et al., "Proposal of the best suited deployment concepts for the identified scenarios and related ran protocols", Dec. 31, 2005, pp. 1-2, 58-67, and 93-97.
Axanas, Johan, et al., "Final report on identfied RI key technologies system concept and their assesment ", Dec. 23, 2005, pp. 1-2, 38-39, and 83-96.
Kim, Kyung-Ah, et al., "A Seamless Handover Mechanism for IEEE 802.16e Broadband Wireless Access", School of Electrical Engineering and Computer Science, Seoul National University, Seoul, Republic of Korea (Feb. 28, 2005), pp. 1-8.
"WiMAX FDD Proposal for Rel 1.x", WiMAX Forum on Motorola (2004), pp. 1-6.
"DL/UL Offset FDD/H-FDD Frame Structure for Release 1.x: Harmonized Proposal", WiMAX Forum on Alcatel-Lucent (Oct. 2, 2007), pp. 1-9.
"Draft Standard for Local and Metropolitan area Networks Part 16: Air Interface for Broadband Wireless Access Systems", IEEE Computer Society P802.16Rev2/D2 (Dec. 2007), pp. 114-536 (Section 6.3), 742-1079 (Section 8.4), and 1107-1263 (Section 11).
International Search Report for International Application No. PCT/IB2008/054113, mailed Jun. 19, 2009, pp. 1-16.
"U.S. Appl. No. 10/089,426, filed Mar. 29, 2002, titled Radio Link System", Pihlaja.
"U.S. Appl. No. 12/035,262, filed Feb. 21, 2008 , titled Frame Structures With Flexible Partition Boundary for Wireless Networks (unpublished)", Chindapol.
"U.S. Appl. No. 12/049,265, filed Mar 14, 2008, titled Techniques for Link Utilization for Half-Duplex and Full-Duplex Stations in a Wireless Network (unpublished)", Chindapol.

* cited by examiner

TECHNIQUES FOR RESOURCE ALLOCATION FOR STATIONS IN A FDD WIRELESS NETWORK

TECHNICAL FIELD

This description relates to wireless networks.

BACKGROUND

In wireless networks, different techniques have been proposed to allocate various media resources to users. One example allocation technique includes Frequency Division Duplexing (FDD), where uplink (UL) transmissions (e.g., from a mobile station to a base station) may occur on a first carrier frequency (or frequencies), and downlink (DL) transmissions (e.g., from a base station to a mobile station) may occur on a second carrier frequency (or frequencies). FDD may offer a relatively efficient use of channel resources. Base stations (BSs), Access Points (APs) or other infrastructure nodes may typically be Full Duplex-FDD (FD-FDD), in which the BSs may transmit and receive at the same time (but on different frequencies). However, some types of mobile stations (MSs) or subscriber stations may be Half Duplex-FDD (HD-FDD) devices, which may either transmit or receive at one time (but typically not both), and may alternate between periods of downlink receiving, and uplink transmission (on different frequencies). Mobile stations in a wireless network may also be Full Duplex-FDD (FD-FDD), in which the MSs may transmit and receive at the same time, but on different channels or frequencies. Problems may arise when attempting to serve both half-duplex (HD) and full-duplex (FD) mobile stations.

SUMMARY

According to an example embodiment, a method of allocating uplink (UL) resources in a wireless network may include transmitting a Map message as part of a first group downlink (DL) region, the Map message allocating, to a mobile station (MS), a first resource in a first group UL region and a second resource in a second group UL region, and transmitting a dummy information element (IE), as part of a second group DL region, the dummy information element (IE) reflecting at least the allocating to the MS of the second resource in the second group UL region.

In another example embodiment, the transmitting a dummy IE may include transmitting a first dummy IE in the first group DL region and a second dummy IE in the second group DL region. For example, each Map may include one or more dummy IEs. In another example embodiment, the dummy IE may reflect both the first resource in the first group and the second resource in the second group. The transmitting a dummy information element (IE) may, for example, include transmitting a dummy UL allocation that indicates an allocation of the second resource in the second group UL region. In another example embodiment, dummy information element (IE) may include a dummy UL allocation that indicates an allocation of the first resource and/or the second resource. In another example embodiment, the dummy UL allocation may indicate an allocation of the second resource in the second group UL region, so as to allow one or more half-duplex mobile stations to identify a location of their resource allocation within a second group UL region, based at least in part on the dummy allocation. In another example embodiment, the dummy information element may include a value indicating a starting point and/or ending point from which a location of one or more additional resource allocations within the second group UL region may be determined for one or more mobile stations. In yet another example embodiment, the dummy information element may include a UL Allocation start information element identifying a start symbol offset or starting reference for any subsequent resource allocations within the second group UL region for one or more half-duplex station or other mobile stations.

In another example embodiment, an apparatus may include a controller, and a wireless transmitter coupled to the controller. The wireless transmitter may be configured to: transmit a Map message as part of a first group downlink (DL) region, the Map message allocating, to a full-duplex (FD) mobile station (MS), a first resource in a first group UL region and a second resource in a second group UL region. The transmitter may also be configured to transmit a dummy information element (IE), as part of a second group DL region, the dummy information element (IE) reflecting at least the allocating to the FD MS of the second resource in the second group UL region. In an example embodiment, the first resource of the first group UL region and the second resource in the second group UL region are provided in one or more subsequent frames. In an example embodiment, the first resource of the first group UL region and the second resource in the second group UL region are provided in one or more subsequent frames.

According to another example embodiment, a method of allocating uplink (UL) resources in a wireless network may include: transmitting a message as part of a downlink (DL) region of a first frame, the message allocating, to each of a plurality of mobile stations operating in full-duplex (FD), a resource of an UL region, and receiving data from one or more of the FD mobile stations via one or more of the allocated UL resources. In an example embodiment, the UL resources allocated to the plurality of mobile stations operating in FD may be provided in an FD area, such as in a contiguous FD area of the UL region.

According to another example embodiment, a method of allocating uplink (UL) resources in a wireless network may include: transmitting a message as part of a downlink (DL) region of a first frame, the message allocating, to each of a plurality of mobile stations operating in full-duplex (FD), both a resource of a group 1 UL region and a resource of a group 2 UL region of a subsequent frame, wherein the group 1 UL resources allocated to the plurality of mobile stations operating in FD being provided in a contiguous FD area of a group 1 UL region of the subsequent frame, and wherein the group 2 UL resources allocated to the plurality of mobile stations operating in FD being provided in a contiguous FD area of a group 2 UL region of the subsequent frame.

According to another example embodiment, an apparatus may include a controller, and a wireless transmitter coupled to the controller. The wireless transmitter may be configured to transmit a message as part of a downlink (DL) region of a first frame, the message allocating, to each of a plurality of mobile stations operating in full-duplex (FD), both a resource of a group I UL region and a resource of a group 2 UL region of a subsequent frame.

According to yet another example embodiment, an apparatus may include a controller, and a wireless transmitter coupled to the controller. The wireless transmitter may be configured to transmit a message as part of a downlink (DL) region of a first frame, the message allocating, to each of a plurality of mobile stations operating in full-duplex (FD), both a resource of a group 1 UL region and a resource of a group 2 UL region of a subsequent frame, wherein the group 1 UL resources allocated to the plurality of mobile stations operating in FD being provided in a contiguous FD area of a group 1 UL region of the subsequent frame, and wherein the group 2 UL resources allocated to the plurality of mobile stations operating in FD being provided in a contiguous FD area of a group 2 UL region of the subsequent frame. In an example embodiment, the group 1 UL region and the group 2 UL region may be adjacent. In another example embodiment, the group 1 UL region and the group 2 UL region may be non-adjacent (e.g., with one or more other UL regions provided therebetween).

According to another example embodiment, a method may include transmitting, to one or more wireless stations in a wireless network: a first Map for a first group of the wireless stations, the first Map allocating a resource, and a second Map for a second group of the wireless stations, the second Map including a dummy IE that reflects the allocation of the resource by the first Map.

According to another example embodiment, an apparatus may include a controller, and a wireless transmitter coupled to the controller. The controller and/or the wireless transmitter may be configured to: transmit, to one or more wireless stations in a wireless network: a first Map for a first group of the wireless stations, the first Map allocating a resource to a full-duplex wireless station or wireless station capable of operating in full-duplex, and a second Map for a second group of the wireless stations, the second Map including a dummy IE that reflects the allocation of the resource by the first Map and allows a location of a subsequent resource allocation to be determined based on the dummy IE.

The details of one or more implementations are set forth in the accompanying drawings and the description below. Other features will be apparent from the description and drawings, and from the claims.

DETAILED DESCRIPTION

Figure 1:
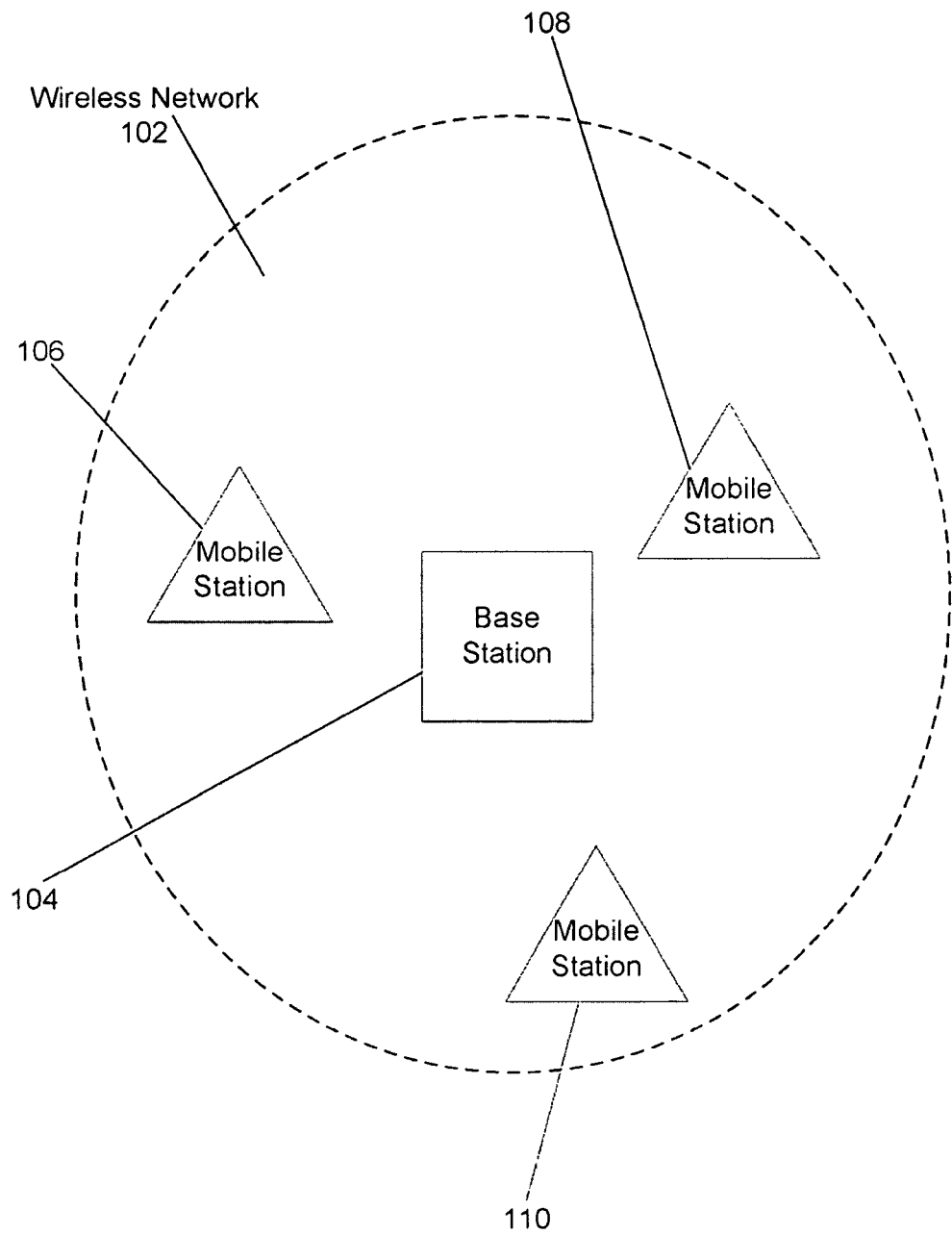
FIG. 1 is a block diagram of a wireless network according to an example embodiment.

FIG. 1 is a block diagram of a wireless network 102 including a base station 104 and three mobile stations 106, 108, 110 according to an example embodiment. Although not shown, mobile stations 106, 108 and 110 may be coupled to base station 104 via relay stations or relay nodes, for example. The wireless network 102 may include, for example, an IEEE 802.16 Wireless Metropolitan Area Network (WiMAX), an IEEE 802.11 Wireless Local Area Network (WLAN), or a cellular telephone network, according to example embodiments. The base station 104 may include a cellular or WiMAX base station (BS), a node B, an 802.11 access point, or other infrastructure node, according to various example embodiments. The term "base station" (BS) may be used herein and may include any type of infrastructure node. The mobile stations 106, 108, 110 may include laptop or notebook computers, smartphones, personal digital assistants (PDAs), cellular telephones, WiMAX device, subscriber station, or any other wireless device, according to example embodiments. The term "wireless node" may include any type of wireless node, such as base stations, mobile stations, etc. While the present disclosure may use some of the terminology of WiMAX or other wireless standards, aspects of the present disclosure may be applicable to any networking or wireless technologies.

Mobile stations in a wireless network may be divided up into two groups (for example) to provide a more efficient use of channel resources, so that a base station (BS) may allocate the uplink carrier frequency and the downlink carrier frequency resources to different groups at a time, or in an alternating or interleaved fashion, to allow HD MSs to use both the uplink and downlink resources. For example, during one time period, a first group (or group 1 of HD MSs) of mobile stations may receive in a downlink direction, while a second group (group 2 of HD MSs) of mobile stations is allowed to transmit in an uplink direction to the BS or infrastructure node. Then, during a second time period, the first group may transmit and the second group may receive.

According to an example embodiment, when a FD MS enters a network, it can join (or become a member of) one or multiple groups at the same time, allowing the FD MS to transmit and receive, at the same time, during one or more, or even all, of the regions of a frame. Also, in an example embodiment, a BS may assign the FD MS to one group at any time including right after network entry and operate as a HD MS, e.g., where a FD MS may behave or operate as a HD MS (e.g., to reduce power consumption), and only if needed via a control message exchange (e.g., with BS), the FD MS may return to a full-duplex (FD) operation to receive and transmit simultaneously in all (or multiple) groups (e.g., operating as a FD MS). The FD MS may alternate its behavior as HD FDD and FD FDD as needed via a control message exchange with BS. The FD MS may also even send a message to the BS to request a change in operating mode from HD to FD, or from FD to HD, for example. In another example embodiment, a FD MS can join one or more groups on the downlink and another group or multiple different groups on the uplink at the same time. In an example embodiment, a FD MS may even be allowed to receive during any group region (e.g., either during group 1 and/or group 2 DL regions), and to transmit during any group region (e.g., during either group 1 or group 2 UL regions).

In an example embodiment, a plurality of mobile stations (MSs) in a Frequency Division Duplexing (FDD) system may communicate with a base station. As described above, to provide for a more efficient use of resources, each MS may be assigned to one or more of a plurality of groups (e.g., group 1, group 2, group 3 for a three group system, or maybe group 1 or group 2 for a two group system). In another example embodiment, each MS may be assigned to one or more of a plurality of groups during the downlink transmissions and another group or another plurality of groups during the uplink transmissions.

Figure 2:
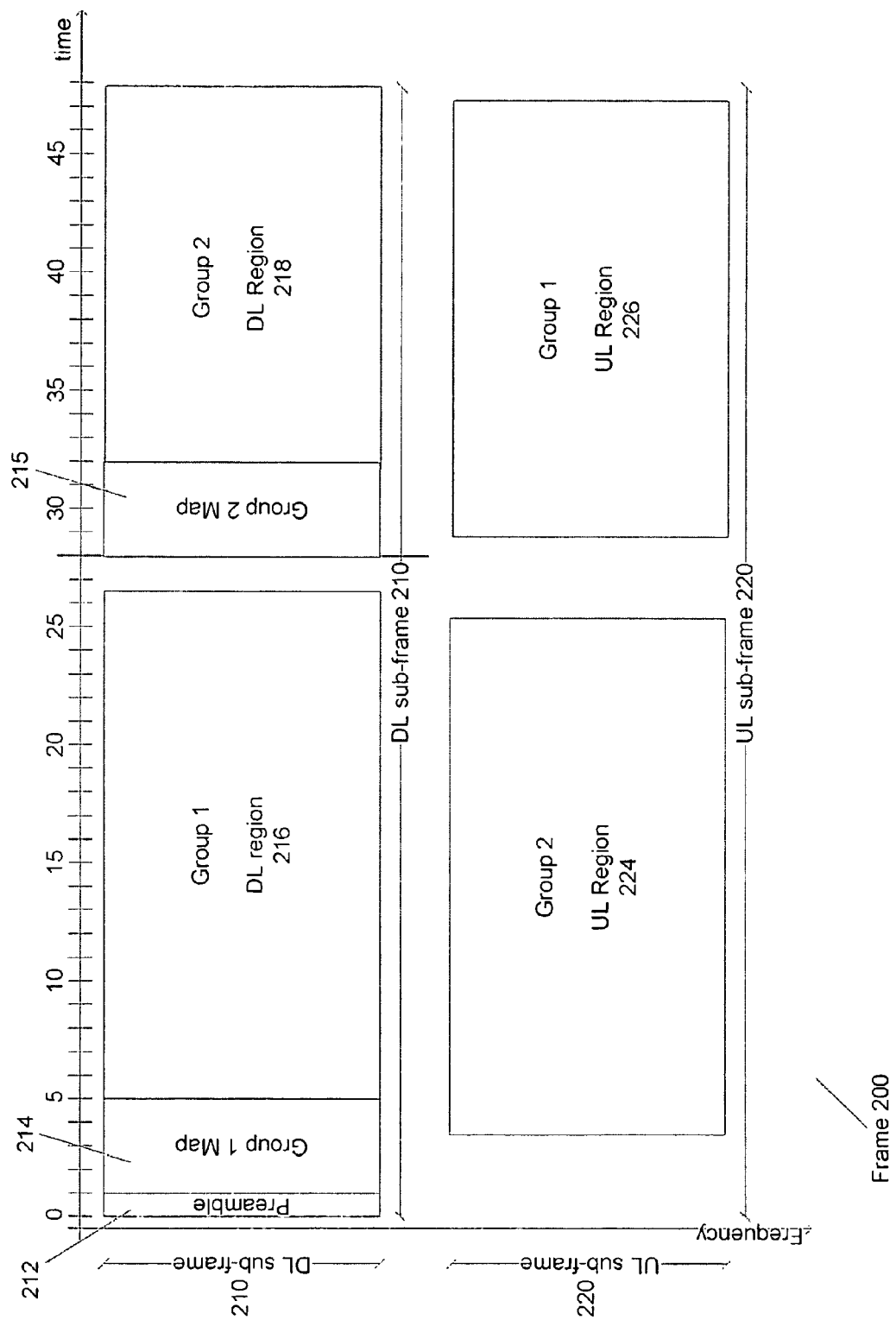
FIG. 2 is a diagram illustrating an example embodiment of a frame that may be used for a Frequency Division Duplexing (FDD) system.

FIG. 2 is a diagram illustrating an example embodiment of a frame that may be used for a Frequency Division Duplexing (FDD) system. Frame 200 may include a DL (downlink) subframe 210 that includes signals transmitted from a base station and received at one or more mobile stations. Frame 200 may include an UL (uplink) subframe 220 that includes signals transmitted from one or more mobile stations and received by a base station. The frame 200 illustrates an example of a FDD system in which one or more mobile stations may receive DL signals via a first frequency (e.g., f1), or first set of frequencies, within a DL subframe 210, and may transmit signals UL to a base station via a second frequency (e.g., f2), or second set of frequencies, within an UL subframe 220.

The DL subframe 210 may include a common preamble 212, since preamble 212 is directed to all groups (e.g., directed to mobile stations for both group 1 and group 2). The preamble 212 may allow mobile stations to perform synchronization. A group-specific Map may be provided for each DL region of frame 200. For example, a group 1 DL region 216 may include a group 1 Map 214, while a group 2 DL region 218 may include a group 2 Map 215. Each Map may include a DL Map and an UL Map, each including information elements identifying resources for downlink and uplink transmissions for one or more mobile stations. Each Map (e.g., Maps 214 and Map 215) may, for example, include Map IEs (information elements) that allocate resources for uplink and/or downlink transmissions for one or more mobile stations. The uplink (UL) subframe 220 may include resources (e.g., OFDM symbols) that allow mobile stations to transmit data to a base station.

The Maps may also provide the grouping information of mobile stations to different groups. The Maps may also include an indication for changing the mobile station from one zone/group to another zone/group.

The UL frame 220 may include at the beginning a switching period (TTG, or BS transmit/receive transition gap). The UL frame 220 may also include a group 2 UL region 224 to allow mobile stations of group 2 to transmit to the base station, and a group 1 UL region 226 to allow group 1 mobile stations to transmit to the base station. In some cases, Full-Duplex (FD) mobile stations (having the ability to transmit and receive on different frequencies at the same time) may receive data during either group 1 DL region 216 and/or group 2 DL region 218, and may transmit (or obtain resources for UL transmission) to the BS via either group 2 UL region 224 and/or group 1 UL region 226.

Figure 3:
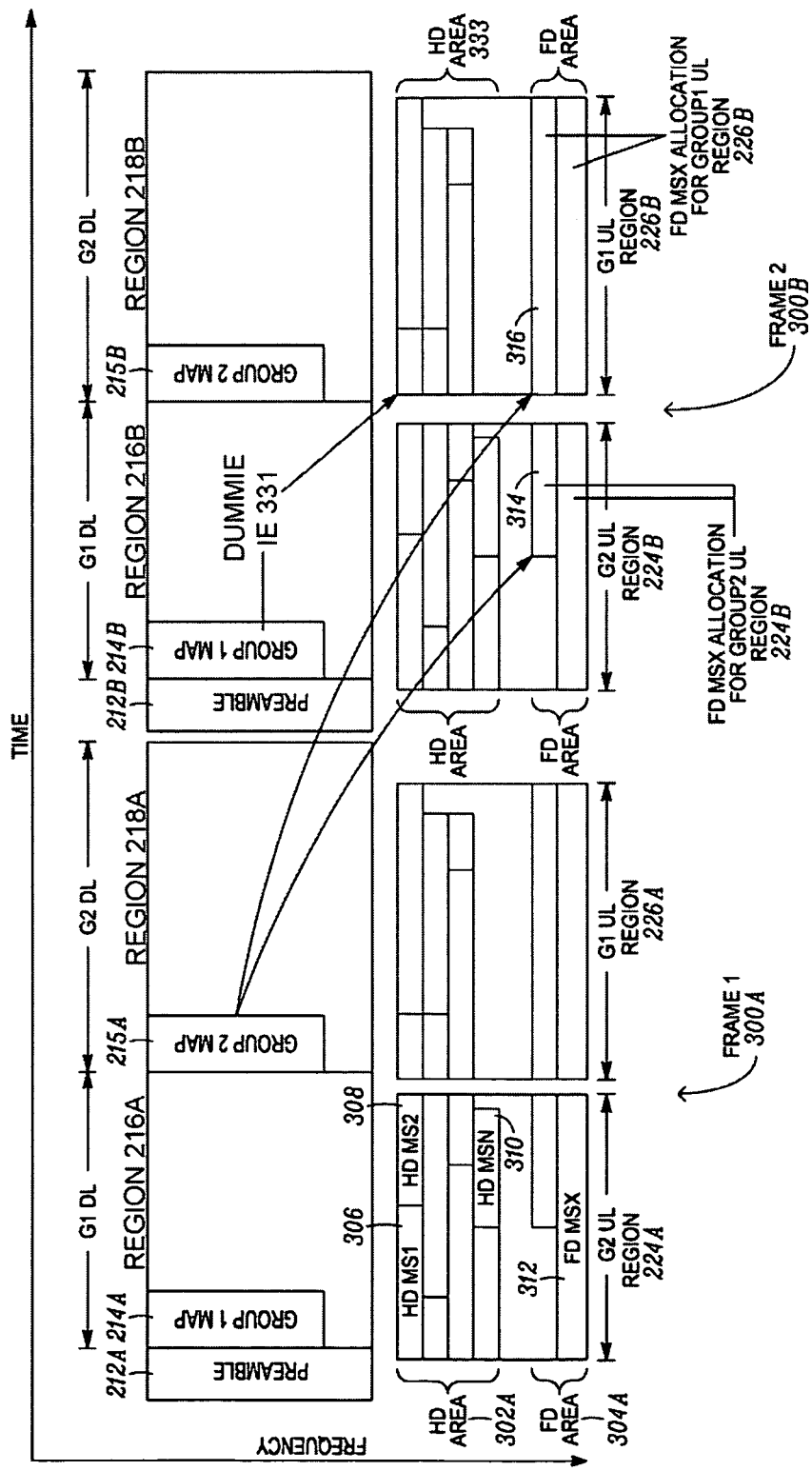
FIG. 3 is a diagram illustrating an example embodiment of a frame that may be used for a Full Duplex Frequency Division Duplexing (FD-FDD) system.

FIG. 3 is a diagram illustrating an example embodiment of a frame that may be used for a full-duplex (FD) Frequency Division Duplexing (FDD) system. In FIG. 3, two frames are illustrated, including frame 1 300A and frame 2 300B (which is subsequent to or after frame 1). Frames 300A and 300B may be very similar to the frame shown in FIG. 2, and the differences will be described.

Frames 300A and 300B may include preamble (either 212A or 212B), a group 1 Map (either 214A or 214B), a group 1 DL region 216A, 216B, a group 2 Map (either 215A or 215B), a group 2 DL region (either 218A or 218B), a switching period among downlink regions, a switching period at the end of the frame, a group 2 UL region (either 224A or 224B) and a group 1 UL region (226A or 226B), respectively (where A suffix indicates elements for frame 1 300A, and B suffix indicates elements for frame 2 300B).

According to an example embodiment, a BS may transmit a group 1 Map 214A, as part of a group 1 DL region 216A of frame 300A. The BS may also transmit a group 2 Map 215A, as part of a group 2 DL region 218A of frame 300A. Either (or both) Maps 214A and 215A may allocate UL and DL resources to HD mobile stations (MSs) and/or FD MSs in any part of the frame 300A (e.g., either or both group 2 DL region 216A and group 1 DL region 218A).

According to an example embodiment, one or more UL resource allocations may be provided in a HD (half-duplex) area of an UL region, while one or more UL resources allocations may be provided in a FD (full-duplex) area of the UL region. For example, group 2 UL region 224A may include a HD (half-duplex) area 302A that includes resources (e.g., bursts or one or more OFDM symbols) allocated to each of one or more HD (half-duplex) MSs. For example, HD area 302A may include a burst or allocation 306 allocated to HD MS1, a burst or allocation 308 allocated to HD MS2, and a burst or resource allocation 310 allocated to HD MS N (half-duplex mobile station N). The resources or symbols may typically be allocated or assigned in a snake-like fashion through the UL region, e.g., extending on a row until the end of the row (or sub-band or channel) is reached, then continuing on the next row.

According to an example embodiment, the BS may allocate resources to both HD-FDD MSs and FD-FDD MSs within any group region (e.g., within Group 2 UL region 224 and/or Group 1 UL region 226) of any uplink sub-frame. Also, according to an example embodiment, the BS may coordinate or schedule the UL resource allocations for FD-FDD MSs so as to provide the UL resources for FD MSs within a contiguous FD area or provide an indication that the allocation in the future uplink sub-frame is continuing from the current allocation.

In addition, a BS may schedule resource allocations to a FD (full-duplex) MS for one or more group regions. For example, a BS may send a UL Map that may include an information element (IE) that allocates or schedules UL resources to a FD MS for one or more group regions. The group regions (in which resources are allocated to the FD MS) may be in a current frame or a subsequent or future frame (e.g., next frame, two frames ahead, three frames ahead), or a mix of different frames (e.g., allocate a first resource of a first group UL region in one frame, and another resource of a second group UL region of another frame). In an example embodiment, the BS may allocate UL resources to a FD MS for two or more group UL regions (e.g., for group UL regions either in a same frame, or across two adjacent or different frames). For example, a BS may allocate to a FD MS a resource of a first group UL region in a first frame, and allocate a resource of a second group UL region of a next frame. As another example BS may allocate to a FD MS a resource of a first group UL region in a first frame, and allocate a resource of a second group UL region of a future (or subsequent) frame. For example, the two UL regions (where resources are allocated to the FD MS) may be adjacent to one another, or may be non-adjacent to one another, as examples.

For example, such a single or multi-region allocation may be signaled by control information (e.g., an information element) associated with one or more group regions. For example, a BS may allocate to a FD MS a first group region resource via a first control information (e.g., first Map IE), and then may allocate to the FD MS a second group region resource via a second control information (e.g., second Map IE). Or alternatively, the BS may allocate resources to the FD MS for both the first group region and the second group region using a single control information (e.g., via a single Map IE, such as a full-duplex Map IE, described in greater detail below).

According to an example embodiment, UL resources may be allocated or provided to one or more FD MSs. For example, a previous Map may have allocated UL resource 312 to FD MSX (full-duplex mobile station X). HD areas and FD areas are shown for group 2 UL region 224A, group 1 UL region 226A of frame 1 300A, and for group 2 UL region 224B and for group 1 UL region 226B of a frame 2 300B. In an example embodiment, the FD area (e.g., FD area 304A) may be a contiguous area within a UL region (e.g., where one or more UL resources may be provided in the FD area, and there may be gaps at the beginning or end of the FD area and/or between UL resources). In an example embodiment, the FD area may not typically include HD allocations, control signals, etc.

According to another example embodiment, one or more dummy IEs (such as, for example, dummy IE 331, FIG. 3) may be provided within a Map of a group DL region. A dummy IE may, for example, reflect or reference (or incorporate) one or more (current) resource allocations (such as a resource allocated to a FDM MS, or a FD area), e.g., by allowing a station to determine a location of one or more subsequent resource allocations (e.g., after the FD area or resource allocated to the FD MS). The dummy IE may reflect (or take into account, or reference or incorporate) a current resource allocation (such as an FD area or one or more resource allocations within an FD area), for example, the dummy IE indicating a location and/or size of the current allocation, or by the dummy IE indicating a location of a next or subsequent resource allocation. These are merely some examples and the disclosure is not limited thereto. IN this manner, a dummy IE may be provided that may reflect (or take into account) a current resource allocation (e.g., resource allocations to one or more FD MSs), and which, for example, may allow another station (e.g., a HD or legacy station or other station) to determine a start of one or more subsequent resource allocations, e.g., based at least in part on the dummy IE.

According to an example embodiment, the dummy IE may be used (e.g., by a HD station or any station) to determine the start (or location) of subsequent resource allocations. For example, the dummy IE (or dummy element) may be represented by, but not limited to, an IE (or element) indicating the start of the subsequent resource allocation, an IE indicating the end of the current resource allocation or an IE indicating a size and/or location of the current resource allocation.

Although FD area 304A within group 2 UL region 224A only shows one UL resource allocation (allocation 312) for a FD mobile station (e.g., either a FD mobile station or a dual mode HD/FD MS operating in a FD mode), the FD area 304A within a group region may include a plurality of UL resources allocated to different FD mobile stations. Providing UL resource allocations for multiple FD MSs within a FD area (such as a contiguous FD area, for example) of a UL region may simplify resource scheduling or allow for simpler resource scheduling, may improve resource usage as this may decrease the risks of gaps or unused resources within the region, and may also reduce overhead when using a dummy IE that may reflect some or even all of the FD resource allocations within the FD area of a UL region (e.g., a dummy IE to reference or reflect a FD area), as described in greater detail below. There may be one or more FD areas, and/or one or more HD areas within an UL region, for example.

According to an example embodiment, the FD area (e.g., FD area 304A), which may include UL resource allocations for each of a plurality of FD mobile stations may be provided at an edge of an UL region. For example, a FD area may be provided at a beginning or top of an UL region, or may be provided at an end or bottom of a UL region. In the example shown in FIG. 3, FD area 304A is shown as being at the end or bottom of the group 2 UL region 224A (although designating top vs. bottom may be a matter of convention).

In an example embodiment, a BS may transmit a message (e.g., Map IE) that may allocate resource(s) of only one group UL/DL region (e.g., allocate a resource(s) to the FD MS in either group 1 UL/DL region or group 2 UL/DL region). Alternatively, a BS may transmit a message (e.g., a Map IE) that may allocate one or more group-specific UL/DL region resources to a FD mobile station. By allocating resources to a FD MS from both group 1 and group 2 UL regions, this may provide the FD MS with better or more efficient use of resources by allowing the FD MS to transmit during both groups UL regions, for example. For example, a BS may transmit a FD UL Map IE to allocate to a FD MS a resource from both group UL regions, such as allocating resources from consecutive group 1 UL region and group 2 UL region or vice-versa (allocate a resource from a group 2 UL region followed by a resource from a group 1 UL region). These group 1 and group 2 UL regions (from which resources may be allocated to a FD MS via a FD UL Map IE) may be adjacent, or non-adjacent regions (e.g., where one or more other regions may be provided therebetween), and may be within a same frame, or in different frames. For example, group 2 Map 215A (FIG. 3) may include a FD UL Map IE to allocate UL resources 314 from group 2 UL region 224B and to allocate UL resources 316 from group 1 UL region 226B to FD MS X. This is merely an example embodiment, and a FD UL Map IE may be provided within group 1 Map 214A (FIG. 3), allocating FD UL resources in one or both UL regions.

In an example embodiment, the UL resources allocated to the FD MS (e.g., via the FD UL Map IE) may be provided in a same frame as the FD UL Map IE, or in a subsequent or future frame(s), such as a next frame, two frames ahead of the Map IE, etc. The example shown in FIG. 3 illustrates an example where a Map IE is provided in Group 2 Map of frame 1 300A, and the UL resources (314, 316) are allocated in a next frame (frame 2 300B), in group 2 UL region 224B and group 1 UL region 226B. However, this is merely an example, and the two UL regions (used for allocation to the FD MS) may each be provided in different frames (e.g., UL region 1 in one frame, and UL region 2 in another frame), and may be 0, 1, 2, 3 or more frames away from (subsequent to) the FD UL Map IE that allocates the resources.

In an example embodiment, the FD UL Map IE may include: an identifier associated with the FD MS (e.g., connection identifier or MS CID identifying the connection associated with MS, a MAC address of the MS, or other MS identifier), and one or more of the following fields for each region for which resources are being allocated to the FD MS in this IE (may be one or two resource allocations, if two groups are used in the frame): a region ID identifying the region as either group 1 UL region or group 2 UL region, information identifying a starting point or location (e.g., symbol offset) of the resource allocation, and a length (e.g., length in number of symbols) of the resource allocation. A FD UL Map IE may also include a field or value identifying a next or subsequent frame (or frame offset) in which a second resource may be allocated, e.g., in the case where a first resource may be provided in a first group UL region of a first frame and a second resource is provided or allocated in a second group UL region of a second or subsequent frame, such as when the two frames may be non-adjacent, as an example.

According to another example embodiment, one or more dummy IEs may be provided within a Map of a group DL region. For example, a legacy (e.g., HD) MS may typically read or receive legacy Map IEs in its own group DL regions, and, may typically not able to recognize a FD UL Map IE transmitted in the other groups. Thus, in such cases, the legacy or HD MS may be unable to detect or decode the FD UL Map IE, and therefore, may not be aware of the allocation to the FD MS in its group UL region. For example, at this failure to see or recognize the local FD MS UL resource allocation in a local region may prevent the HD MS from determining a location of its own UL resource allocation. Therefore, the BS may send or transmit a dummy IE in each, some or all regions, e.g., to reflect the local allocation to the FD MS. Also, a dummy IE may be provided in one of the group Maps, or in both group Maps, e.g., a dummy IE in group 1 Map, and also a dummy IE in the group 2 Map. Thus, a dummy IE may be provided in one or both group's Maps. A dummy IE may be used, for example, to determine the start of subsequent resource allocations and may be represented by, but not limited to, an IE (or element) indicating the start (or location) of the subsequent resource allocation, an IE indicating the end of the current resource allocation or an IE indicating the size of the current resource allocation. These are merely some examples of a dummy IE, and other types of dummy IEs may be used.

For example, as shown in FIG. 3, a FD UL Map IE may be provided in a group 2 Map 215A (within group 2 DL region 218A), allocating (to FD MS X) resource 314 for group 2 UL region and resource 316 for group 1 uplink region. In such an example, a group 1 HD MS may not detect or know that there has been a FD MS allocation 316 in group 1 UL region 226B. Thus, a dummy IE may be sent as part of a group 1 Map 214A or group 1 Map 214B (as examples) or even of previous frames, to reflect the group 1 resource allocation to the FD MS. The example of FIG. 3 illustrates, merely as an example, a dummy IE 331 sent as part of the group 1 Map 214B, to identify a start (or starting or reference point) of the HD area 333 for group 1 UL region 226B. Other types of dummy IEs may be used, such as a dummy allocation to the FD MS, or other information that may reflect the FD MS allocation for the local group region (group other than the FD UL Map IE), or which may allow the HD MS or legacy MS to determine a location of its local resource allocation (e.g., within group 1 UL region in this example), or which may allow some or all HD MSs in a certain group to detect or to decode a portion of that group UL region not allocated to them. Other example dummy IEs are described below.

Figure 4:
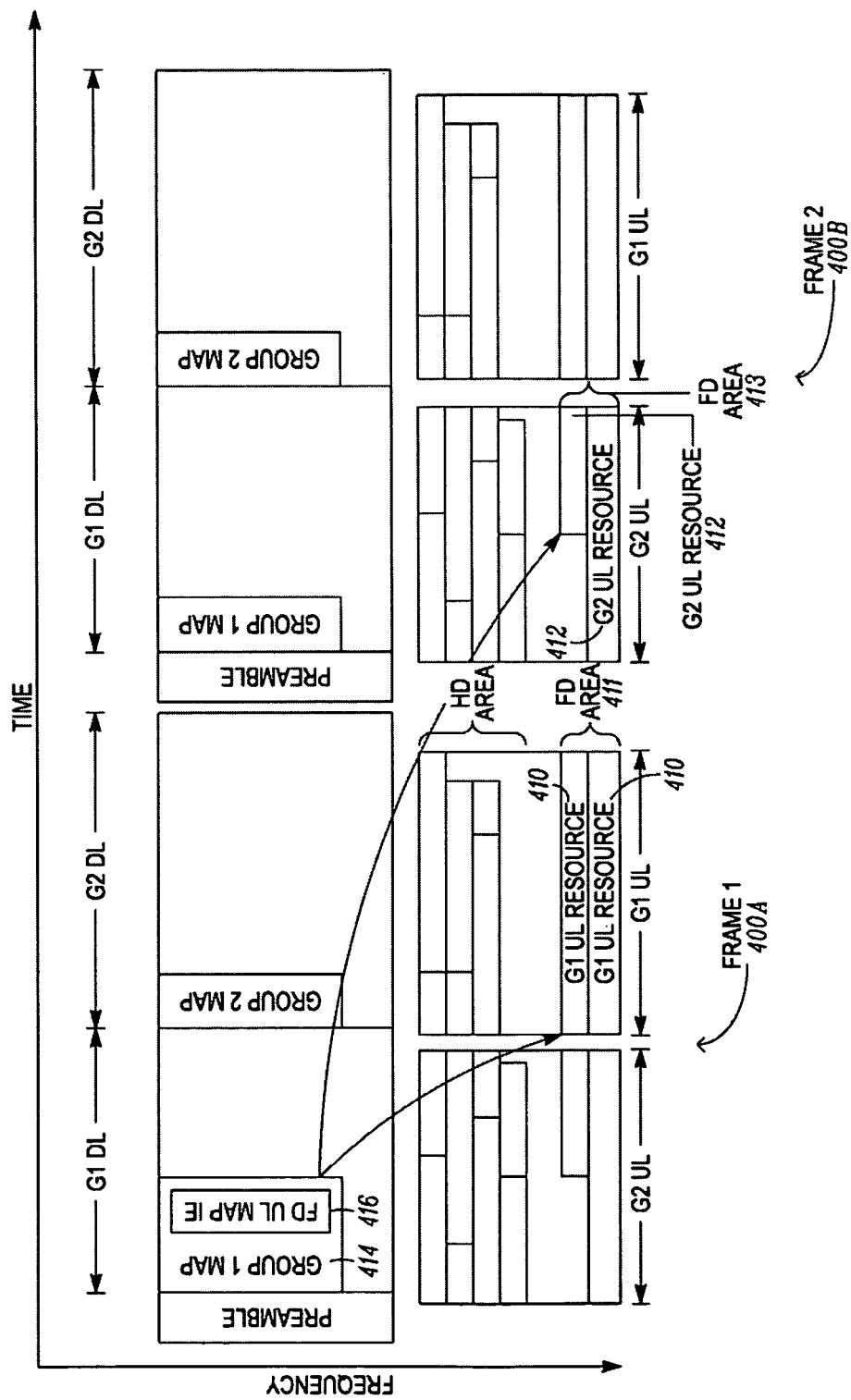
FIG. 4 is a diagram illustrating another example embodiment of a frame that may be used for a Full Duplex Frequency Division Duplexing (FD-FDD) system.

FIG. 4 is a diagram illustrating another example embodiment of a frame that may be used for a Frequency Division Duplexing (FDD) system. Two consecutive frames are shown, including a frame 1 400A and a frame 2 400B. A group 1 downlink region of frame 1 400A may include a group 1 Map 414. Group 1 Map 414 may include a FD UL Map IE 416. The FD UL Map IE 416 may allocate to the FD MS each one or both a first resource 410 (e.g., within a FD area 411) of the group 1 UL region and a second resource 412 (e.g., within another FD area 413) of a group 2 UL region (e.g., where the group 1 UL region and group 2 UL region may be consecutive or adjacent). Although only one resource allocation is shown for each of FD areas 411, 413, these FD areas may each include multiple resource allocations. In an example embodiment, each FD MS may be allocated an UL resource from a group 1 UL region and a group 2 UL region or from both, and each UL region may include a FD area that provides (or groups together) UL resources for multiple FD mobile stations. In this example, the FD UL Map IE 416 may allocate a group 1 UL resource 410 in a same frame (Frame 1 400A) and a group 2 UL resource 412 in a subsequent frame. However, both of the allocated resources (group 1 and group 2 resources) may be provided in other frames, e.g., in a next frame, 2 frames, both in frame 2 400B, etc. FIG. 4 merely illustrates another example. Although not shown in FIG. 4, a dummy IE may be provided as part of the group 2 Map of frame 1 400A (for example), which may reflect the FD MS allocation of the group 2 UL resource 412, or as part of the group 1 Map of frame 2 400B (as another example).

Figure 5:
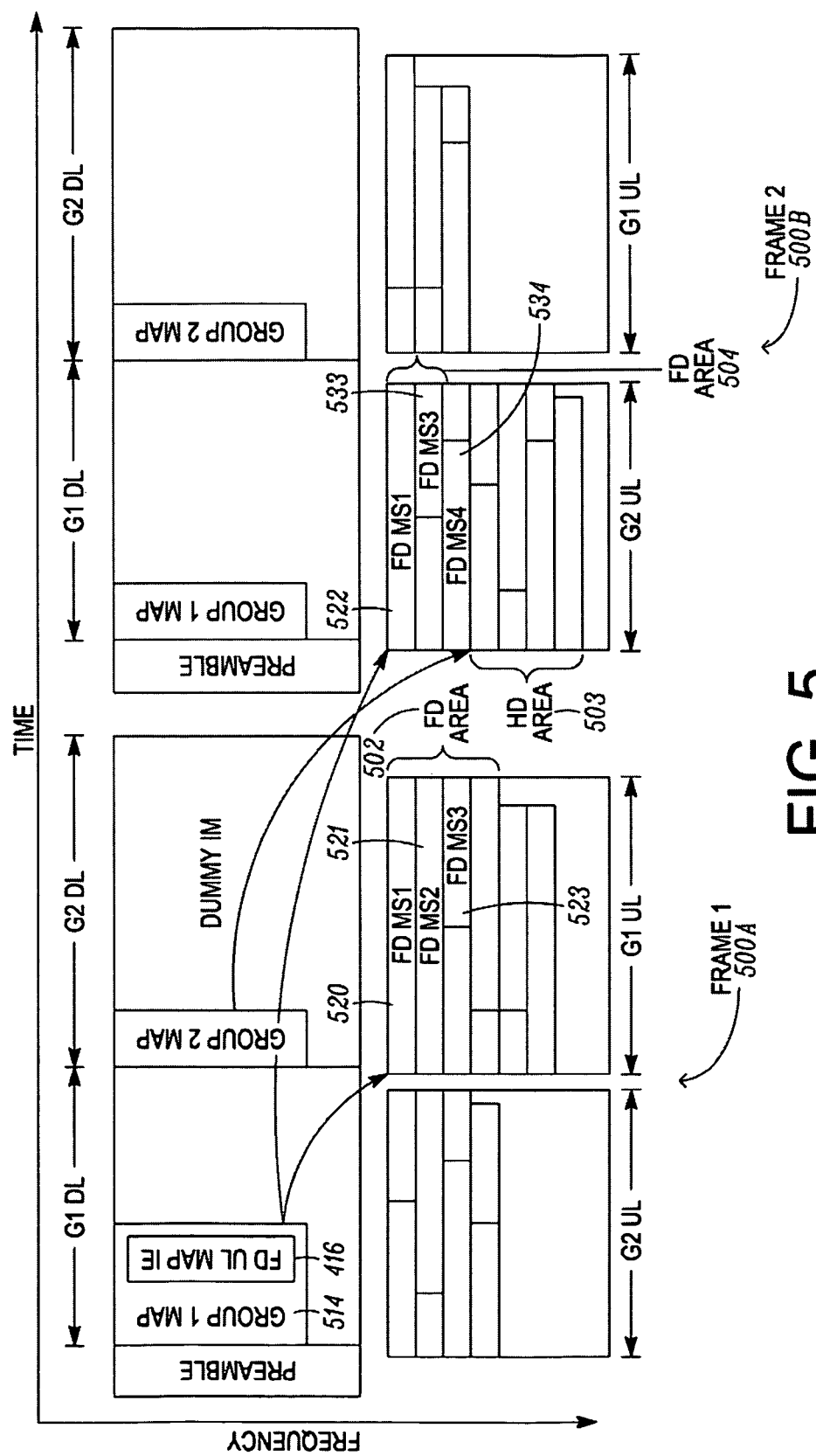
FIG. 5 is a diagram illustrating another example embodiment of a frame that may be used for a Full Duplex Frequency Division Duplexing (FD-FDD) system.

FIG. 5 is a diagram illustrating yet another example embodiment of a frame that may be used for a Frequency Division Duplexing (FDD) system. Two frames are shown in FIG. 5, including a frame 1 500A, and a frame 2 500B. In the example embodiment shown in FIG. 5, FD area 502 (in group 1 UL region) and FD area 504 (in group 2 UL region) are each located at the top or beginning of their respective UL regions. The group 1 Map of group 1 DL region of frame 1 500A may include a FD UL Map IE 416 to allocate resources to a FD MS from each or both group 1 UL region and group 2 UL region. For example, FD area 502 (within group 1 UL region of frame 1 500A) may include resource 520 allocated to FD MS1, resource 521 allocated to FD MS2, and resource 523 allocated to FD MS3. FD area 504 of group 2 UL region of frame 2 500B may include resource 522 allocated to FD MS 1, a resource 533 allocated to FD MS3, and a resource 534 allocated to FD MS4. Thus, it can be seen that FD MS1 and FD MS3 each have been allocated resources from two group regions, whereas FD MS2 and FD MS4 have each been allocated resources only from one UL region, for example.

In addition, according to an example embodiment, a Map IE (such as, for example, a FD UL Map IE 416, FIG. 5) allocating resources in multiple group regions for a FD MS may be provided in a Map of only one of the DL group regions, since the FD MS may be able to read or receive the Map in both group regions. Therefore, for the resource allocations to FD MSs, it may be unnecessary (and may be inefficient) to include copies of the FD UL Map IEs in Maps for both regions. However, if a FD UL Map IE, allocating resources for both group 1 and group 2 UL regions, is included in only the group 1 Map, then group 2 HD or legacy mobile stations (e.g., unable to receive the group 1 Map) may be unable to identify the locations of their UL resources, since, a HD MS may determine the location of its UL resources with respect to or based upon, reading one or more previous resource allocations in its local region Map, and vice-versa if a FD UL Map IE is included in only the group 2 Map.

Therefore, according to an example embodiment, one or more dummy IEs may be provided within one of the Maps (e.g., within the group 2 Map in this example) to reflect at least the allocation (aggregate or standalone) to the FD MS of the resource in the group 2 UL region by the group 1 Map (e.g., FD UL Map IE 416, within group 1 Map). This dummy IE may, for example, provide for backwards compatibility with legacy (e.g., HD) mobile stations which are unable to determine or detect the allocation to the FD MS by the Map in the other group UL region. Moreover, a dummy IE may increase the efficiency of resource usage, since it may incorporate one or more UL FD allocations into a single UL allocation. According to an example embodiment, the dummy IE may be used (e.g., by a HD station or any station) to determine the start (or location) of subsequent resource allocations. For example, the dummy IE (or dummy element) may be represented by, but not limited to, an IE (or element) indicating the start of the subsequent resource allocation, an IE indicating the end of the current resource allocation or an IE indicating a size and/or location of the current resource allocation. These are merely some example dummy IEs, and other types of dummy IEs may be used.

For example, one dummy IE may reflect or indicate multiple UL FD resource allocations. In an example embodiment, the dummy IE may be a dummy allocation provided in the group 2 Map (in this example of FIG. 5), which may at least indicate or provide the appearance of an allocation of the group 2 UL resources that were actually allocated by the group 1 Map. Thus, the dummy allocation may provide a way for group 2 HD MSs to determine a location of their UL resources or to allow them to detect or decode a portion of the group 2 UL region.

In an example embodiment, the dummy IE may provide a value indicating a starting point or reference point from which a location starts of one or more resources, or from which a location or starting point of one or more resources may be determined. Alternatively, the dummy IE may provide a value indicating an ending point or reference point to which a location ends of one or more resources. Alternatively, the dummy IE may provide values indicating both a starting point and an ending point of one or more resources. For example, the dummy IE may be an UL Allocation start information identifying a start symbol offset or starting reference for any subsequent resource allocations within that UL region of the frame to which the dummy IE refers. For example, the dummy IE (e.g., UL Allocation Start information) may be provided in frame 1 500A, and it may provide a starting reference for subsequent allocations within that UL region (e.g., within group 2 UL region in frame 2 500B). For example, as shown in FIG. 5, the dummy IE may point to (or provide a reference starting point) the start or beginning of the UL resource allocations for HD mobile stations (point to start of HD area 503 of group 2 UL region of a subsequent frame 500B, for example).

For example, one or more dummy IEs may be provided. A dummy IE may be provided for an entire or partial FD area (e.g., pointing to a starting reference after the beginning of a FD area), or for a portion of a group UL region. Or, multiple dummy IEs may be provided, e.g., in order to cover the scenarios where there are multiple FD areas in one UL region. For example, if a Map of a group 1 UL region allocates resources for group 1 UL region and a group 2 UL region to a FD MS, then a dummy IE (or more than 1 dummy IE) may be provided in a group 2 Map, e.g., which may allow group 2 HD MSs to determine a location of their UL resources within the group 2 UL region.

According to an example embodiment, an FD area may be provided as a group of resource allocations for one or more FD MSs, and may be located at an edge (e.g., top or bottom) of a group UL region. Separate and multiple areas may, for example, be provided for FD MSs (FD area) and HD MSs (HD area) within a group UL region.

In cases where there are multiple FD-FDD bursts (allocations) being allocated in a group UL region, the information elements containing information about location and size of the allocation may be contained only in the Map of the first group UL region (e.g., Map 1 of group 1 UL region) and a dummy information element may be used in all other UL regions (e.g., Map 2 for group 2 UL region). The information contained in the first group region may also indicate the number of group UL regions being allocated for the FD MS. According to an example embodiment, one example use or purpose of a dummy information element may be to reduce the amount of overhead by aggregating essential information such as locations and sizes into a single IE that is compatible with the current 802.16 standard and may appear to other H-FDD terminals as another H-FDD IE (as an example). Upon processing this dummy IE, H-FDD terminals can typically determine where their resource allocation starts and ends, for example. FD-FDD terminals may only need to read all the IEs in the first region; in that case, they can safely ignore dummy IEs in all other regions.

Although it is desirable to define a new IE (such as the FD UL IE) for F-FDD terminals to allow F-FDD-specific features and increase the efficiency, backward compatibility to legacy H-FDD terminals may be desirable. In one example embodiment, although not limiting, due to a current limitation of a "snake-like" allocation in the current IEEE 802.16 standard, HD-FDD terminals may be unable to determine their UL resource allocations without successfully decoding all prior Map IEs including the new ones that cannot be understood by legacy HD MSs. To get around this, we introduce the use of dummy IEs (aggregate dummy IE—reflecting multiple resource allocations within a region, or standalone dummy IE—reflecting a single resource allocation) for one or more regions and append new FD-FDD-specific IEs after HD-FDD specific IEs and eventually dummy IEs. Upon processing of the MAP IEs, the H-FDD MSs may typically know or determine where the dummy allocation (for FD-FDD terminals) ends or starts and further processing of the new FD-FDD-specific IEs has no impact and can be safely ignored. On the contrary, the FD-FDD terminals may typically continue processing until the relevant IEs are found.

Since the allocation of FD-FDD terminals may, for example, start from the first region, it may be necessary to insert a dummy IE within the frame allocation in order to fill the gap. The use of dummy IEs can also be applied to the cases of PHY layer fragmentation.

The various examples, techniques and approaches described herein may be applied to allocate resources across multiple group UL regions for a number of cases or examples, such as: 1) for a first case where MAC layer fragmentation is applied, and a first SDU (service data unit) fragment is provided in a first group UL region, and a second SDU fragment is provided in a second group UL region, with each fragment including its own MAC header, FSH (fragmentation header describing the SDU fragmentation), data and CRC. 2) a second case in which 1 burst or resource allocation is provided across two group regions, by continuous allocation across the two regions (one Map IE, one MAC header, one data field, one CRC, and no FSH for the two regions, since no SDU fragmentation). This may be done as if there are no boundaries between group regions; 3) a third case in which there is PHY layer fragmentation, in which one MAC header, one data field, and one CRC is provided for the allocations across the two (or multiple) group regions, and fragmentation is performed in the PHY layer, and may be unknown to the MAC layer processing, for example, and 4) a fourth case in which 1 burst or resource allocation is provided across two group regions, by continuous allocation across the two regions (two Map IEs, one MAC header, one data field, one CRC, and no FSH for the two regions, since no SDU fragmentation). This may be done as if there are no boundaries between group regions).

In order to reduce the power consumption of the FD-FDD MSs and re-use existing power save concept in HD-FDD, the FD-FDD MSs may work as HD-FDD MSs and a group indication may be assigned to each FD-FDD MS as it was H-FDD. The FD-FDD MSs with a group indication may act as an HD-FDD terminals (e.g., they will listen and transmit to only one group). For example, FD-FDD MS/terminal may typically listen to only one map message while in HD-FDD mode. When needed, the BS can send a special message/ indication in the DL control message or piggybacked to the downlink data to the corresponding terminal to toggle the current mode used by a FD-FDD terminal (e.g., from FD-FDD to HD-FDD or from HD-FDD to FD-FDD). Such message may direct such FD-FDD terminal to further listen to control information transmitted in another group or engage in a transmission/reception in another group. A FDD terminal may ask, through a message/indication or through a piggybacked signaling, the BS in order to toggle its current mode (e.g., from FD-FDD to HD-FDD or from HD-FDD to FD-FDD). A messaging handshake such as ACK, MAC response message or explicit UL transmission may be used to ensure reliability of the group indication command.

A FD-FDD MS or terminal may operate as a HD-FDD MS regarding one or the combination of one or more of the following features, as examples: Downlink control information (e.g. MAP, DCD, Paging); Downlink data (e.g. data regions allocation); Uplink control information (e.g. ranging zone, HARQ ACK, sounding); Uplink data (e.g. uplink burst allocation); Power saving mechanism (e.g. resume from power saving as the MS was in one group); Idle Mode; Hand over; Any other features which may be done in HD-FDD mode.

A FDD MS which is not operating in HD-FDD mode for a given feature is operating in FD-FDD mode for that feature, for example. Also, a MS may negotiate with the BS the set of features that are currently running as HD-FDD, for example.

Figure 6:
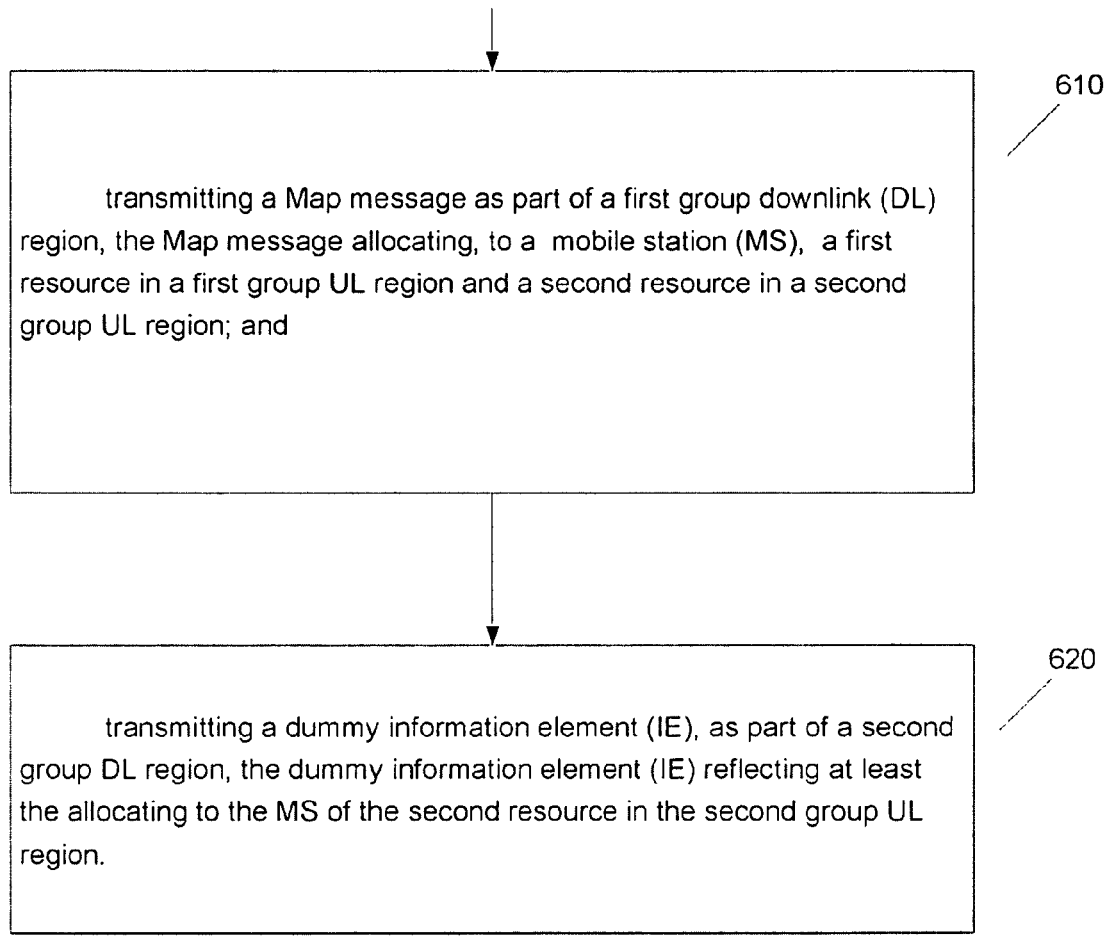
FIG. 6 is a flow chart illustrating operation of a wireless node according to an example embodiment.

FIG. 6 is a flow chart illustrating operation of a wireless node according to an example embodiment. The method of FIG. 6 may be a method of allocating uplink (UL) resources in a wireless network. The method may include, for example: transmitting (610) a Map message as part of a first group downlink (DL) region, the Map message allocating, to a mobile station (MS) (e.g., HD or FD MS), a first resource in a first group UL region and a second resource in a second group UL region; and transmitting (620) a dummy information element (IE), as part of a second group DL region, the dummy information element (IE) reflecting at least the allocating to the MS of the second resource in the second group UL region. In an example embodiment, the MS may be a full-duplex (FD) MS.

In an example embodiment, the dummy IE may reflect the allocating of the first resource in the first group UL region and the second resource in the second group UL region. In another example embodiment, the transmitting (620) a dummy IE may include transmitting multiple dummy IEs, such as, for example, transmitting a first dummy IE in the first group DL region (e.g., within a first Map) and transmitting a second dummy IE in the second group DL region (e.g., within a second Map). In an example embodiment, the first group UL region and the second group UL region (from which resources are allocated to the FD MS) may be in a same frame or may be in different frames. Also, the group 1 UL region and the group 2 UL region may be adjacent regions (e.g., within a same or different frame) or may be non-adjacent regions (e.g., with one or more other regions therebetween).

In an example embodiment, the transmitting (610) the Map message may include transmitting a) UL Map IE as part of the first group DL region, the UL Map IE allocating to the MS both the first resource of the first group UL region and the second resource of the second group UL region, the first group UL region being provided in a first frame, and the second group UL region being provided in a second frame. For example, the MS to which the resource is allocated may be a FD MS.

In an example embodiment, the transmitting (610) the Map message may include transmitting a full-duplex (FD) UL Map IE as part of the first group DL region, the FD UL Map IE allocating to the FD MS both the first resource of the first group UL region and the second resource of the second group UL region, the first group UL region and the second group UL region being provided in a same frame.

In an example embodiment, the transmitting (610) the Map message may include transmitting a FD UL map IE as part of the first group DL region, the FD UL Map IE including at least an identifier associated with the FD MS, and information identifying the location and length of the first resource and the second resource.

In an example embodiment, the transmitting (610) the Map message may include transmitting a UL map IE (e.g., such as a FD UL Map IE) as part of the first group DL region, the UL Map IE including at least an identifier associated with the MS, and for each of the first and second resources one or more of: a region ID to identify either the first group UL region or the second group UL region, a symbol offset to identify a starting location of the resource, and a number of symbols to identify a length of the resource.

In an example embodiment, the transmitting (620) a dummy information element (IE) may include transmitting a dummy UL allocation that indicates an allocation of the second resource in the second group UL region.

In an example embodiment, the transmitting (620) a dummy information element (IE) may include transmitting a dummy UL allocation that indicates an allocation of the first resource and the second resource.

In an example embodiment, the transmitting (620) a dummy information element (IE) may include transmitting a dummy UL allocation that indicates an allocation of the second resource in the second group UL region, so as to allow one or more half-duplex mobile stations to identify a location of their resource allocation within a second group UL region, based at least in part on the dummy allocation.

In an example embodiment, the dummy information element may include a value indicating a starting point and/or ending point from which a location of one or more resource allocations within the second group UL region may be determined for one or more mobile stations. Since a dummy IE may be used to determine the start of subsequent resource allocations, it may be represented by, but not limited to, an IE indicating the start of the subsequent resource allocation, an IE indicating the end of the current resource allocation or an IE indicating the size of the current resource allocation.

In an example embodiment, the dummy information element may include a UL Allocation start information element identifying a start symbol offset or starting reference for any subsequent resource allocations within the second group UL region for one or more half-duplex or other mobile stations.

According to another example embodiment an apparatus may include, for example, a controller, and a wireless transmitter coupled to the controller. The wireless transmitter may be configured to: transmit a Map message as part of a first group downlink (DL) region, the Map message allocating, to a full-duplex (FD) mobile station (MS), a first resource in a first group UL region and a second resource in a second group UL region, t; and transmit a dummy information element (IE), as part of a second group DL region, the dummy information element (IE) reflecting at least the allocating to the FD MS of the second resource in the second group UL region.

While "first" and "second" are used (both with reference to FIG. 6 and other figures and examples herein) to reference different UL regions, the terms "first" and "second" are not necessarily referring to order of the UL regions. Rather, for example, first and second are used to identify different UL regions, and are not limited to a specific order in which these regions appear or occur. The same is true for group 1 and group 2, where "1" and "2" do not necessarily mean a specific order, but are referring to different groups (the order may be same as or different than the numerals, 1, 2, 3, . . . ). In general, the terms first and second, or group 1, group 2, . . . may refer to different regions or groups, and are not limited to a specific order, according to an example embodiment. For example, the Map message (that allocates resources to a FD MS) may be provided on one group DL region, and a dummy IE may be provided in another group DL region. This is merely an example embodiment. In an example embodiment, the first group UL region and the second group UL region may be adjacent, while in another embodiment, these UL regions may be non-adjacent. In another example embodiment, the use of 1 and 2 for group 1 and group 2 may indicate an order or a group within a frame assignment, as examples.

Figure 7:
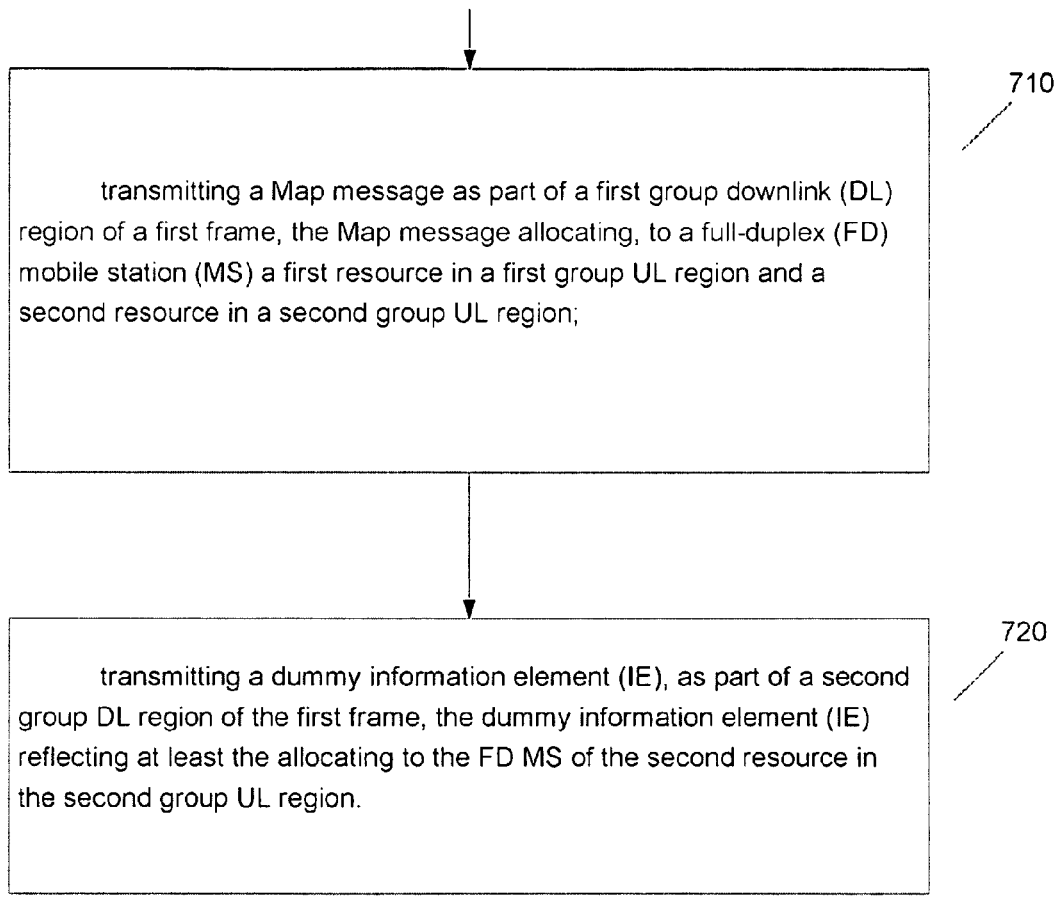
FIG. 7 is a flow chart illustrating operation of a wireless node according to another example embodiment.

FIG. 7 is a flow chart illustrating operation of a wireless node according to another example embodiment. The method of FIG. 7 may include a method of allocating uplink (UL) resources in a wireless network. The method may include: transmitting (710) a Map message as part of a first group downlink (DL) region of a first frame, the Map message allocating, to a full-duplex (FD) mobile station (MS) a first resource in a first group UL region and a second resource in a second group UL region; and transmitting (720) a dummy information element (IE), as part of a second group DL region of the first frame, the dummy information element (IE) reflecting at least the allocating to the FD MS of the second resource in the second group UL region.

In an example embodiment, the first resource of the first group UL region and the second resource of the second group UL region are provided in one or more subsequent frames. For example, the first resource may be provided in a second frame (e.g., one frame after the first frame), and the second resource may be provided in a third frame (e.g., two frames after the first frame). Or, the second resource may be provided two frames after the first frame, and the first resource may be provided three frames after the first frame. In other example embodiments, the first resource and the second resource may be provided in a same frame (e.g., in the frame after the first frame, or in a frame that is 2 or 3 frames after the first frame). These are merely some examples.

In the method of FIG. 7, the first group may include a group 1 and the second group comprises a group 2 for a frequency division duplex network, wherein HD mobile stations in the wireless network are assigned to either the group 1 or the group 2, wherein group 1 and group 2 mobile stations transmit and receive in an alternate fashion, and FD mobile stations may transmit and receive during regions associated with one or both of group 1 and group 2.

In the method of FIG. 7, the first group may include a group 2 and the second group comprises a group 1 for a frequency division duplex network, wherein HD mobile stations in the wireless network are assigned to either the group 1 or the group 2, wherein group 1 and group 2 mobile stations transmit and receive in an alternate fashion, and FD mobile stations may transmit and receive during regions associated with one or both of group 1 and group 2.

In the method of FIG. 7, the dummy information element may include a dummy UL allocation provided that indicates an allocation of the second resource in the second group UL region of the subsequent frame, so as to allow one or more half-duplex (or other) mobile stations to identify a location of a second group UL allocation, based at least in part on the dummy information element.

In the method of FIG. 7, the dummy information element may include a value indicating a starting point or ending point (or both) from which a location of one or more resource allocations within the second group UL region may be determined for one or more half-duplex mobile stations.

In the method of FIG. 7, the transmitting (720) the dummy information element may include transmitting a dummy UL allocation that indicates an allocation of the second resource in the second group UL region of the subsequent frame, so as to allow one or more half-duplex (or other) mobile stations to identify a location of a second group UL allocation of the subsequent frame, based at least in part on the dummy allocation.

Figure 8:
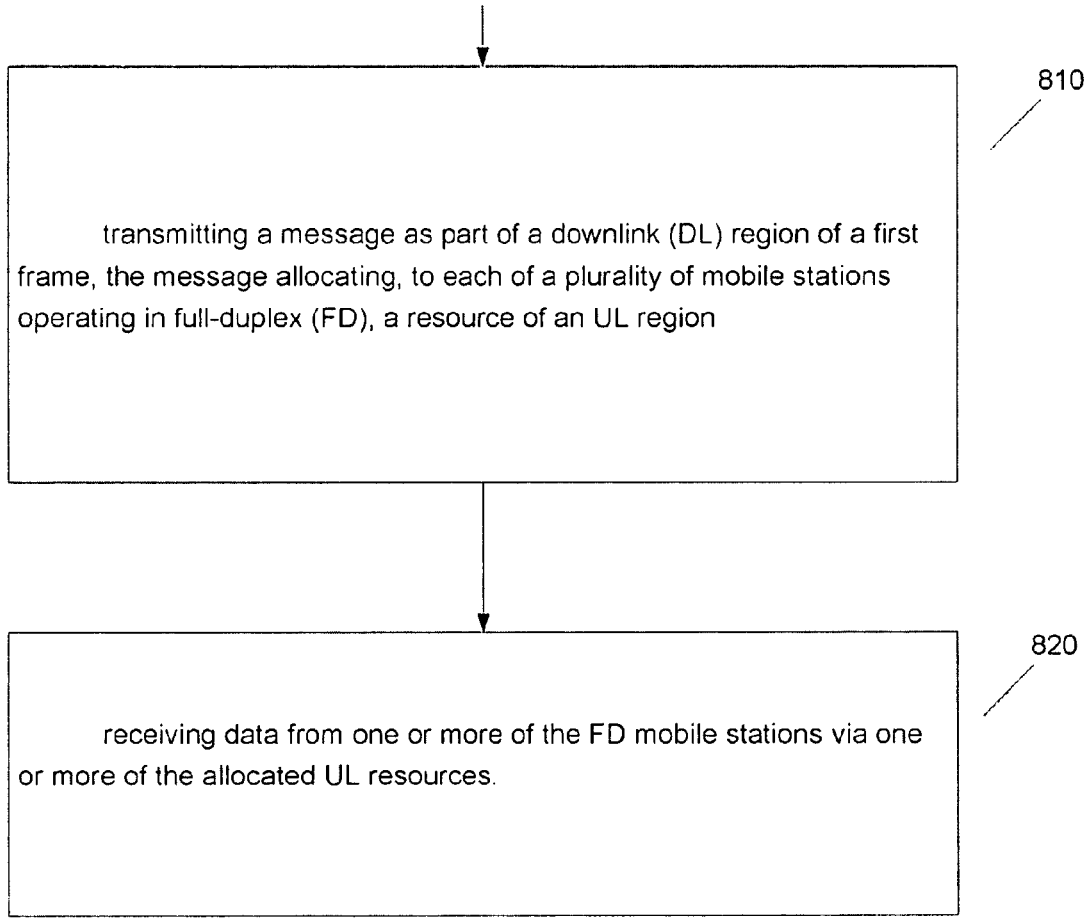
FIG. 8 is a flow chart illustrating operation of a wireless node according to another example embodiment.

FIG. 8 is a flow chart illustrating operation of a wireless node according to another example embodiment. The method may include allocating uplink (UL) resources in a wireless network. The method may include transmitting (810) a message as part of a downlink (DL) region of a first frame, the message allocating, to each of a plurality of mobile stations operating in full-duplex (FD), a resource of an UL region. The method may also include receiving (820) data from one or more of the FD mobile stations via one or more of the allocated UL resources.

In the method of FIG. 8, the transmitting (810) a message may include transmitting a message as part of a downlink (DL) region of a first frame, the message allocating, to each of a plurality of mobile stations operating in full-duplex (FD), a resource of an UL region of a frame, such as a subsequent (or future) frame.

In the method of FIG. 8, the UL resources allocated to the plurality of FD mobile stations are provided in a contiguous FD area. The FD area may, for example, be located at an edge of the UL region.

In the method of FIG. 8, the UL resources allocated to the plurality of FD mobile stations are provided in an area at either a top (or beginning) or bottom (or end) of the UL region of a subsequent frame.

In the method of FIG. 8, the UL resources allocated to the plurality of FD mobile stations may be provided in contiguous areas of the UL region of a subsequent frame. By contiguous, for example, the contiguous FD area may include one or more FD allocations within the FD area, and the contiguous FD area may include gaps within the FD area, such as between FD resource allocations in the FD area or at the beginning or end of the FD area. In one example embodiment, the contiguous FD area may not typically include other types of information, such as HD allocations, control signals, etc., which, for example, may allow one dummy IE to reference or incorporate an entire FD area. Or, alternatively, multiple dummy IEs may be provided, with each dummy IE referencing or incorporating a different FD resource allocation, for example. Although, in other embodiments, it is possible for an FD area to include other types of information, for example.

Figure 9:
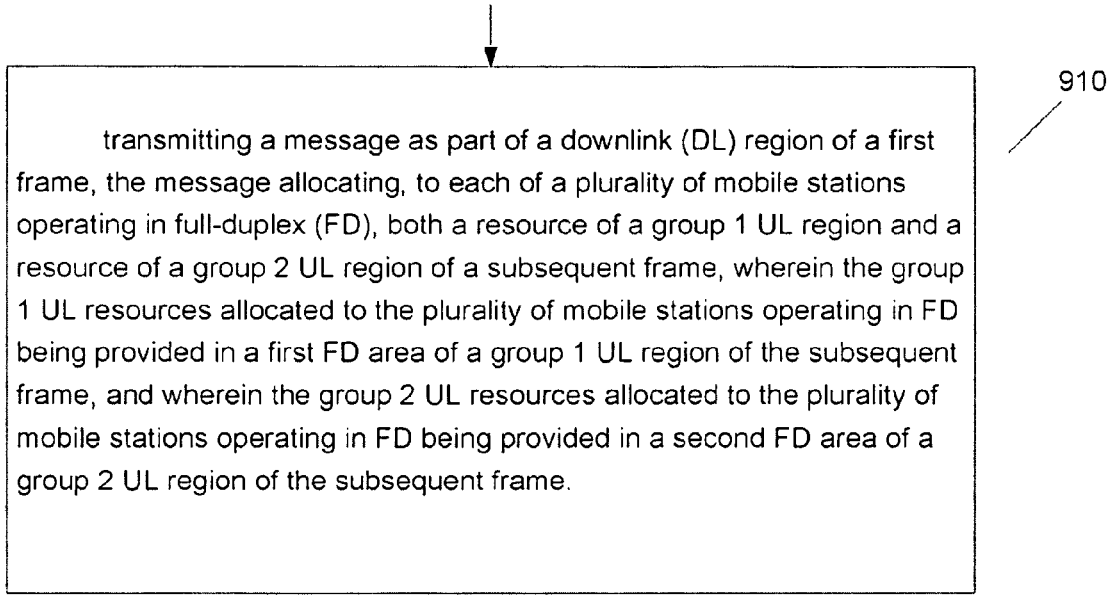
FIG. 9 is a flow chart illustrating operation of a wireless node according to yet another example embodiment.

FIG. 9 is a flow chart illustrating operation of a wireless node according to yet another example embodiment. The method may include allocating uplink (UL) resources in a wireless network, and may include, for example: transmitting (910) a message as part of a downlink (DL) region of a first frame, the message allocating, to each of a plurality of mobile stations operating in full-duplex (FD), both a resource of a group 1 UL region and a resource of a group 2 UL region of a subsequent frame, wherein the group 1 UL resources allocated to the plurality of mobile stations operating in FD being provided in a first FD area of a group 1 UL region of the subsequent frame, and wherein the group 2 UL resources allocated to the plurality of mobile stations operating in FD being provided in a second FD area of a group 2 UL region of the subsequent frame.

In the flowchart of FIG. 9, the group 1 UL resources allocated to the plurality of FD MSs may be provided in a first contiguous FD area at an edge of the group 1 UL region of the subsequent frame, and wherein the group 2 UL resources allocated to the plurality of FD MSs are provided in a second contiguous FD area at an edge of the group 2 UL region of the subsequent frame.

In the flowchart of FIG. 9, the group 1 UL resources allocated to the plurality of FD MSs may be provided in a first contiguous area at either a top or bottom of the group 1 UL region of the subsequent frame, and wherein the group 2 UL resources allocated to the plurality of FD MSs are provided in a second contiguous area at either a top or bottom of the group 2 UL region of the subsequent frame.

According to another example embodiment, an apparatus may include a controller, and a wireless transmitter coupled to the controller. The wireless transmitter may be configured to the wireless transmitter configured to transmit a message as part of a downlink (DL) region of a first frame, the message allocating, to each of a plurality of mobile stations operating in full-duplex (FD), both a resource of a group 1 UL region and a resource of a group 2 UL region of a subsequent frame.

According to another example embodiment, an apparatus may include a controller, and a wireless transmitter coupled to the controller. The wireless transmitter may be configured to transmit a message as part of a downlink (DL) region of a first frame, the message allocating, to each of a plurality of mobile stations operating in full-duplex (FD), both a resource of a group 1 UL region and a resource of a group 2 UL region of a subsequent frame, wherein the group 1 UL resources allocated to the plurality of mobile stations operating in FD being provided in a contiguous FD area of a group 1 UL region of the subsequent frame, and wherein the group 2 UL resources allocated to the plurality of mobile stations operating in FD being provided in a contiguous FD area of a group 2 UL region of the subsequent frame. According to an example embodiment, there may be 1 or more HD areas, and 1 or more FD areas within an UL region. In one example embodiment, a dummy IE may reflect (or incorporate) one or more FD allocations, or an FD area (e.g., reflect or incorporate an FD area that includes one or more FD allocations, such as a UL resource allocation to each of a plurality of FD MSs). In another example embodiment, the dummy IE may reflect (or incorporate) a portion of an UL region that may include HD allocations, FD allocations, gaps, or control signals. The dummy IE may, for example, allow a HD/legacy MS to skip a portion of the UL region (e.g., which may be allocated to other MSs, such as one or more FD MSs, or HD MSs, or allocated for control information), and determine a location of its UL resource allocation based on the dummy IE. For example, the details of the portion of the UL region (e.g., one or more HD, or FD allocations, gaps, control signals, etc. within the portion) reflected by the dummy IE may be not be hidden or unknown to HD/legacy MS, although these are merely some examples and the disclosure is not limited thereto.

According to another example embodiment, a method may include (e.g., a base station or other infrastructure node) transmitting, to one or more wireless stations in a wireless network: a first Map (e.g., group 2 Map 215A, FIG. 3, as an example) for a first group of the wireless stations, the first Map allocating a resource (e.g., resource 314 for FD MS), and a second Map (e.g., group 1 Map 214A, FIG. 3) for a second group of the wireless stations, the second Map including a dummy IE that reflects the allocation of the resource by the first Map.

In an example embodiment, one or more of the wireless stations use frequency division duplexing for uplink and downlink transmissions (e.g., where a first frequency or set of frequencies may be used for UL transmission, and a different or second frequency or set of frequencies may be used for DL transmission). Also, in an example embodiment, the first Map for a first group may allocate a resource to a FD (full-duplex) wireless station or a wireless station capable of operating in full-duplex (e.g., since, FD stations may be capable of operating in full-duplex or half-duplex mode of operation, in an example embodiment). In an example, the first Map (e.g., Map 215A, FIG. 3) may be provided in a first frame and the second Map (e.g., Map 214B) may be provided in a second frame (e.g., frame 2, FIG. 3). Or in another example embodiment, the first Map that allocates a resource to a FD station (such as group 1 Map 514 in frame 1 500A) and the second Map (such as group 2 Map in frame 1 500A) may be provided in a same frame (e.g., as shown in FIG. 5).

According to an example embodiment, an apparatus may include a controller, and a wireless transmitter coupled to the controller. The controller and/or the wireless transmitter may be configured to: transmit, to one or more wireless stations in a wireless network: a first Map for a first group of the wireless stations, the first Map allocating a resource to a full-duplex wireless station or wireless station capable of operating in full-duplex, and a second Map for a second group of the wireless stations, the second Map including a dummy IE that reflects the allocation of the resource by the first Map and allows a location of a subsequent resource allocation to be determined based on the dummy IE. In an example embodiment, the dummy IE may include either a dummy IE that indicates an end (or ending location) of the resource allocated to the full-duplex wireless station, and/or a dummy IE that indicates a start (or starting location) and/or size of a subsequent resource allocation.

Figure 10:
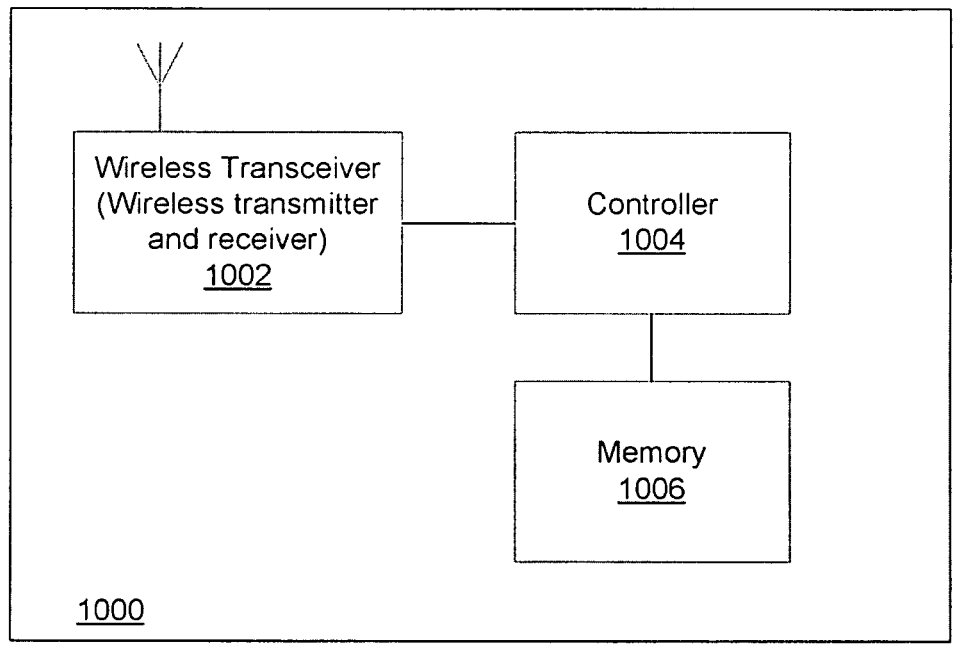
FIG 10 is a block diagram of a wireless node according to an example embodiment.

FIG. 10 is a block diagram of a wireless station (or wireless node) 1000 according to an example embodiment. The wireless station 1000 (e.g. base station 104 or mobile node 106, 108, 110) may include, for example, a wireless transceiver (or wireless interface) 1702, including a transmitter to transmit signals and a receiver to receive signals, a controller 1004 to control operation of the station and execute instructions or software, and a memory 1006 to store data and/or instructions. Controller 1004 may also make decisions or determinations, generate frames or messages for transmission, decode received frames or messages for further processing, and other tasks or functions described herein.

Controller 1004 may be programmable and capable of executing software or other instructions stored in memory or on other computer media to perform the various tasks and functions described above, such as one or more of the tasks or methods described above.

In addition, a storage medium may be provided that includes stored instructions, which when executed by a controller or processor may result in the controller 1004, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method of allocating uplink (UL) resources in a wireless network, said method comprising:
   transmitting a Map message as part of a first group downlink (DL) region, the Map message allocating, to a mobile station (MS), a first resource in a first group UL region and a second resource in a second group UL region; and
   transmitting a dummy information element (IE), as part of a second group DL region, the dummy information element (IE) reflecting at least the allocating to the MS of the second resource in the second group UL region to indicate to the MS the second resource in the second group UL region that was allocated to the MS, wherein the second group DL region occurs subsequently to the first group DL region,
   wherein the dummy information element comprises a value indicating a starting point or ending point from which a location of one or more resource allocations within the second group UL region may be determined for one or more mobile stations.

2. The method of claim 1 wherein the MS is a full-duplex (FD) MS.

3. The method of claim 1 wherein the dummy IE reflects the allocating of the first resource in the first group UL region and the second resource in the second group UL region.

4. The method of claim 1 wherein the transmitting a dummy IE comprises transmitting a first dummy IE in the first group DL region and a second dummy IE in a second group DL region.

5. The method of claim 1 wherein the first group UL region and the second group UL region are adjacent.

6. The method of claim 1 wherein the first group UL region and the second group UL region are non-adjacent.

7. The method of claim 1 wherein the transmitting the Map message comprises transmitting an UL Map IE as part of the first group DL region, the UL Map IE allocating to the MS both the first resource of the first group UL region and the second resource of the second group UL region, the first group UL region being provided in a first frame, and the second group UL region being provided in a second frame.

8. The method of claim 7 wherein the MS to which the resource is allocated is a full-duplex MS.

9. The method of claim 1 wherein the transmitting the Map message comprises transmitting a full-duplex (FD) UL Map IE as part of the first group DL region, the FD UL Map IE allocating to the FD MS both the first resource of the first group UL region and the second resource of the second group UL region, the first group UL region and the second group UL region being provided in a same frame.

10. The method of claim 1 wherein the transmitting the Map message comprises transmitting a full-duplex (FD) UL map IE as part of the first group DL region, the FD UL Map IE including at least an identifier associated with the MS, and information identifying the location and length of the first resource and the second resource.

11. The method of claim 1 wherein the transmitting the Map message comprises transmitting an UL map IE as part of the first group DL region, the UL Map IE including at least an identifier associated with the MS, and for each of the first and second resources: a region ID to identify the group UL region in which the allocation applies, a symbol offset to identify a starting location of the resource, and a number of symbols to identify a length of the resource.

12. The method of claim 11 wherein the UL MAP IE is an FD UL (full-duplex Uplink) map IE.

13. The method of claim 1 wherein the transmitting a dummy information element (IE) comprises transmitting a dummy UL allocation that indicates an allocation of the second resource in the second group UL region.

14. The method of claim 1 wherein the transmitting a dummy information element (IE) comprises transmitting a dummy UL allocation that indicates an allocation of the first resource and the second resource.

15. The method of claim 1 wherein the transmitting a dummy information element (IE) comprises transmitting a dummy UL allocation that indicates an allocation of the second resource in the second group UL region, so as to allow one or more mobile stations to identify a location of their resource allocation within a second group UL region, based at least in part on the dummy allocation.

16. The method of claim 1 wherein the dummy information element comprises a UL Allocation start information element identifying a start symbol offset or starting reference for any subsequent resource allocations within the second group UL region for one or more mobile stations.

17. An apparatus comprising:
a controller; and
a wireless transmitter coupled to the controller, the wireless transmitter configured to:
transmit a Map message as part of a first group downlink (DL) region, the Map message allocating, to a full-duplex (FD) mobile station (MS), a first resource in a first group UL region and a second resource in a second group UL region; and
transmit a dummy information element (IE), as part of a second group DL region, the dummy information element (IE) reflecting at least the allocating to the FD MS of the second resource in the second group UL region to indicate to the MS the second group UL region that was allocated to the MS, wherein the second group DL region occurs subsequently to the first group DL region,
wherein the dummy information element comprises a value indicating a starting point or ending point from which a location of one or more resource allocations within the second group UL region may be determined for one or more mobile stations.

18. A method of allocating uplink (UL) resources in a wireless network, said method comprising:
transmitting a Map message as part of a first group downlink (DL) region of a first frame, the Map message allocating, to a full-duplex (FD) mobile station (MS), a first resource in a first group UL region and a second resource in a second group UL region; and
transmitting a dummy information element (IE), as part of a second group DL region of the first frame, the dummy information element (IE) reflecting at least the allocating to the FD MS of the second resource in the second group UL region to indicate to the MS the second group UL region that was allocated to the MS, wherein the second group DL region occurs subsequently to the first group DL region,
wherein the dummy information element comprises a value indicating a starting point or ending point from which a location of one or more resource allocations within the second group UL region may be determined for one or more half-duplex mobile stations.

19. The method of claim 18 wherein the first resource of the first group UL region and the second resource of the second group UL region are provided in one or more subsequent frames.

20. The method of claim 18 wherein the first resource of the first group UL region and the second resource of the second group UL region are provided in a subsequent frame.

21. The method of claim 18 wherein the first group UL region and the second group UL regions are adjacent.

22. The method of claim 18 wherein the first group UL region and the second group UL region are non-adjacent.

23. The method of claim 18 wherein the first group comprises a group 1 and the second group comprises a group 2 for a frequency division duplex network, wherein HD mobile stations in the wireless network are assigned to either the group 1 or the group 2, wherein group 1 and group 2 mobile stations transmit and receive in an alternate fashion, and FD mobile stations may transmit and receive during regions associated with one or both of group 1 and group 2.

24. The method of claim 18 wherein the first group comprises a group 2 and the second group comprises a group 1 for a frequency division duplex network, wherein HD mobile stations in the wireless network are assigned to either the group 1 or the group 2, wherein group 1 and group 2 mobile stations transmit and receive in an alternate fashion, and FD mobile stations may transmit and receive during regions associated with one or both of group 1 and group 2.

25. The method of claim 18 wherein the dummy information element comprises a dummy UL allocation provided that indicates an allocation of the second resource in the second group UL region of the subsequent frame, so as to allow one or more half-duplex (or other) mobile stations to identify a location of a second group UL allocation, based at least in part on the dummy allocation.

26. The method of claim 18 wherein the transmitting a dummy information element (IE) comprises transmitting a dummy UL allocation that indicates an allocation of the second resource in the second group UL region of the subsequent frame, so as to allow one or more half-duplex (or other) mobile stations to identify a location of a second group UL allocation of the subsequent frame, based at least in part on the dummy allocation.

27. The method of claim 18 wherein the transmitting a dummy information element (IE) comprises transmitting a dummy IE that reflects an area of an UL region to be skipped by an HD MS, or which allows one or more half-duplex mobile stations to identify a location of a second group UL allocation of the subsequent frame, based at least in part on the dummy IE.

28. A method comprising:
transmitting, to one or more wireless stations in a wireless network:
a first Map for a first group of the wireless stations, the first Map allocating a resource, and
a second Map for a second group of the wireless stations, the second Map including a dummy IE that reflects the allocation of the resource by the first Map to indicate to the second group of the wireless stations of the allocated resource, wherein the second Map is sent subsequently to the first Map,
wherein the dummy information element comprises a value indicating a starting point or ending point from which a location of one or more resource allocations within the second group of the wireless stations may be determined for one or more half-duplex mobile stations.

29. The method of claim 28 wherein one or more of the wireless stations use frequency division duplexing for uplink and downlink transmissions.

30. The method of claim 28 wherein the first Map for a first group allocates a resource to a FD wireless station.

31. The method of claim 28 wherein the first Map is provided in a first frame and the second Map is provided in a second frame.

32. The method of claim 28 wherein the first Map and the second Map are provided in a same frame.

33. An apparatus comprising:
   a controller; and
   a wireless transmitter coupled to the controller, the wireless transmitter configured to:
   transmitting, to one or more wireless stations in a wireless network:
   a first Map for a first group of the wireless stations, the first Map allocating a resource to a full-duplex wireless station or wireless station capable of operating in full-duplex, and
   a second Map for a second group of the wireless stations, the second Map including a dummy IE that reflects the allocation of the resource by the first Map and allows a location of a subsequent resource allocation to be determined based on the dummy IE, the dummy IE to indicate to the second group of the wireless stations of the allocated resource, wherein the second Map is sent subsequently to the first Map,
   wherein the dummy IE comprises either a dummy IE that indicates an end (or ending location) of the resource allocated to the full-duplex wireless station, and/or a dummy IE that indicates a start (or starting location) and/or size of a subsequent resource allocation.

* * * * *